United States Patent [19]

Lee

[11] Patent Number: 5,724,663
[45] Date of Patent: Mar. 3, 1998

[54] CAR PHONE CONNECTED TO A VEHICLE AUDIO UNIT HAVING VISUAL INDICATION

[75] Inventor: Jong-Yong Lee, Kyungki-Do, Rep. of Korea

[73] Assignee: Hyundai Motor Company, Ltd., Seoul, Rep. of Korea

[21] Appl. No.: 515,943

[22] Filed: Aug. 16, 1995

[30] Foreign Application Priority Data

| Aug. 16, 1994 | [KR] | Rep. of Korea | 94-20057 |
| Aug. 16, 1994 | [KR] | Rep. of Korea | 94-20058 |
| Aug. 16, 1994 | [KR] | Rep. of Korea | 94-20059 |

[51] Int. Cl.⁶ .................................................. H04Q 7/32
[52] U.S. Cl. ....................... 455/557; 455/566; 455/567
[58] Field of Search ................................. 379/58, 63, 428; 455/89, 346, 557, 566, 567

[56] References Cited

U.S. PATENT DOCUMENTS

| 4,025,728 | 5/1977 | Jacobson. | |
| 4,056,696 | 11/1977 | Meyerle et al. | 379/58 |
| 4,680,787 | 7/1987 | Marry | 379/63 |
| 4,706,273 | 11/1987 | Spear et al. | 379/58 |
| 4,850,006 | 7/1989 | Sasaki et al. | 379/58 |
| 4,850,015 | 7/1989 | Martin | 379/428 |
| 4,868,862 | 9/1989 | Ryoichi et al. | 379/58 |
| 4,870,676 | 9/1989 | Lewo | 379/58 |
| 4,875,229 | 10/1989 | Palett et al. | 379/58 |
| 4,903,325 | 2/1990 | Yoshitake et al. | 455/89 |
| 4,905,270 | 2/1990 | Ono | 379/58 |
| 5,048,117 | 9/1991 | Aisaka et al. | 455/89 |
| 5,054,115 | 10/1991 | Sawa et al. | 455/89 |
| 5,148,471 | 9/1992 | Metroka et al. | 379/58 |
| 5,191,602 | 3/1993 | Regen et al. | 379/58 |
| 5,241,582 | 8/1993 | Park | 379/58 |
| 5,243,640 | 9/1993 | Hadley et al. | 379/59 |
| 5,397,556 | 3/1995 | Mauri et al. | 379/58 |
| 5,418,836 | 5/1995 | Yazaki | 379/58 |
| 5,490,202 | 2/1996 | Maekawa | 379/58 |
| 5,493,703 | 2/1996 | Yamashita | 455/89 |
| 5,537,673 | 7/1996 | Nagashima et al. | 455/346 |
| 5,557,653 | 9/1996 | Paterson et al. | 379/58 |

FOREIGN PATENT DOCUMENTS

| 000483956 | 5/1992 | European Pat. Off. | 379/58 |
| 004118992 | 12/1992 | Germany | 379/58 |
| 0035546 | 4/1981 | Japan | 379/58 |
| 0054025 | 3/1988 | Japan | 379/59 |
| 0176052 | 7/1988 | Japan | 379/59 |
| 404157853 | 5/1992 | Japan | 379/58 |
| 5-20450 | 3/1993 | Japan. | |
| 6-6440 | 1/1994 | Japan. | |
| 2235851 | 3/1991 | United Kingdom | 381/169 |

OTHER PUBLICATIONS

Motorola, Incorporated, "DYNA TAC Cellular Mobile Telephone", Jun. 1983.
GTE Airfone Incorporated, "It's for you . . . ", Jan. 1994.
Hello Direct, "Cellbase", Jan. 1995.

*Primary Examiner*—William Cumming
*Attorney, Agent, or Firm*—Birch, Stewart, Kolasch & Birch, LLP

[57] ABSTRACT

A method of operating a telephone device, having a plurality of telephone jacks, connectable with an audio unit, a plurality of speakers, and a plurality of microphones, all located in a vehicle. The telephone device connects to the audio unit through the telephone jacks where parameters are set for the telephone device to perform a telephone operation. The telephone device receives an incoming telephone signal through one of the telephone jacks, and transmits an outgoing telephone signal through one of the telephone jacks that is selectively activated to perform the telephone operation.

14 Claims, 10 Drawing Sheets

CAR PHONE CONNECTED TO A VEHICLE AUDIO UNIT HAVING VISUAL INDICATION

BACKGROUND OF THE INVENTION

1. Field of the Invention

The present invention relates to a transmitting/receiving type of car phone and more particularly, to an improved car phone connected to a vehicle audio unit by adding a car phone function to a vehicle audio unit for selectively using a transmitting function and a receiving function in combination with the vehicle audio unit.

2. Description of Related Art

Various types of car phone systems which include a cord phone or a cordless phone disposed on a dashboard or a console box in a vehicle are known in the art. However, it is dangerous, inconvenient and difficult for a driver to maneuver a steering wheel with one hand and operate a car phone with the other hand. It is also inconvenient to speak over the car phone in a loud voice, and it is expensive to install additional devices for improving the transmitting and receiving functions of the car phone.

Speaker telephone devices including a microphone and a loud speaker which may be situated in a single housing are known in the art. Such speaker telephone devices are disclosed in U.S. Pat. No. 4,025,728, Japanese Patent Laid Open No. 6-6440, and Japanese Utility Model Laid Open No. 5-20450. However, such conventional speaker telephone devices do not disclose a multiservice system disposed therein for relatively controlling the audio and car phone functions.

SUMMARY OF THE INVENTION

Accordingly, it is an object of the present invention to provide a car phone having transmitting and receiving functions which eliminates the above problems encountered with conventional car phone devices.

Another object of the present invention is to provide an improved car phone having transmitting and receiving functions which is combined with the vehicle audio system.

Briefly described, the present invention is directed to a method of operating a telephone device connectable with an audio unit, a plurality of speakers and a plurality of microphones, all located in a vehicle, comprising the steps of:

providing the telephone device with a plurality of telephone jacks and connecting the telephone device with the audio unit;

setting parameters for the telephone device connected to the audio unit to carry out a telephone operation;

receiving an incoming telephone signal through one of the telephone jacks; and transmitting an outgoing telephone signal through one of the telephone jacks, wherein said one of the telephone jacks is selectively activated to carry out the telephone operation.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
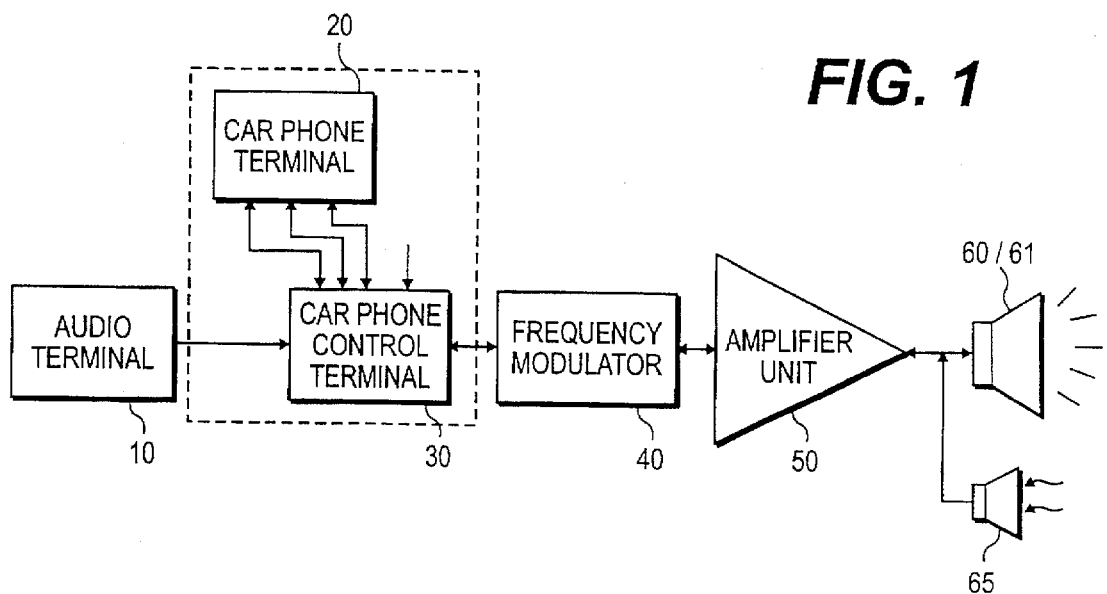
FIG. 1 is a block circuit diagram of a transmitting/receiving type car phone connected to a vehicle audio unit according to an embodiment of the present invention.

Referring now in detail to the drawings for the purpose of illustrating preferred embodiments of the present invention, a transmitting/receiving type of car phone as shown in FIG. 1, includes a car phone control terminal 30 connected to a vehicle audio terminal 10 and a car phone terminal 20 for controlling the vehicle audio and car phone terminals 10 and 20. A frequency modulator 40 is provided for modulating signals produced by the car phone controlling terminal 30, an amplifier unit 50 is provided for amplifying the signals generated by the frequency modulator 40, a headphone or front and rear speakers 60 and 61 are provided for outputting the amplified audio signals, and microphones 65 are provided for receiving audible information. The signals input to the car phone control terminal 30 via the amplifier unit 50 and the frequency modulator 40 are such that the car phone terminal 20 will transmit the received signals.

Figure 2A:
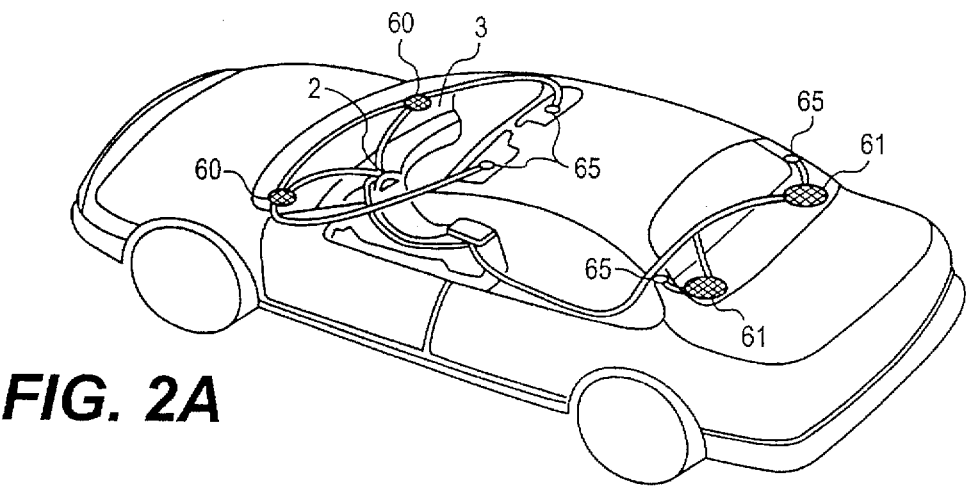
FIG. 2(A) is a perspective view of the combined car phone and audio unit installed in a vehicle according to an embodiment of the present invention.
Figure 2B:
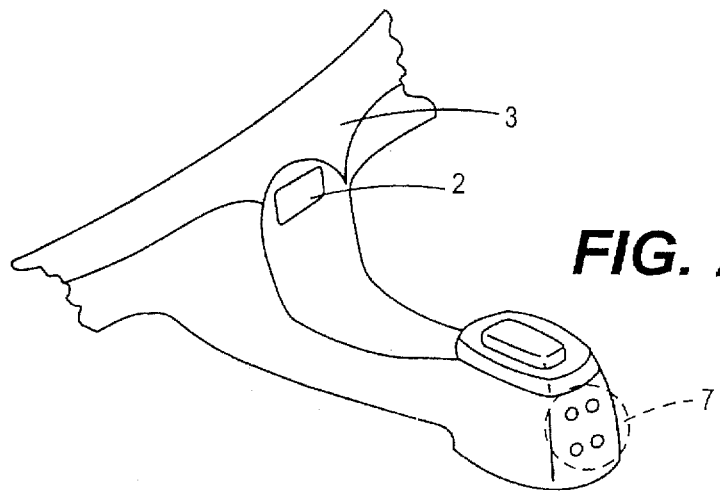
FIG. 2(B) is an enlarged perspective view of the car phone installed in a vehicle according to an embodiment of the present invention.

As shown in FIGS. 2(A) and 2(B), the vehicle audio terminal 10 and the car phone terminal 20 form a composite structure for integratingly operating with each other and are disposed in a car phone housing 2 which is centrally located on a dashboard 3. The front and rear speakers 60 and 61, respectively, are connected to the car phone housing 2, and the microphones 65 may be located on sun visors and rear vehicle frames or the like for enabling speaking into the phone from anywhere in the vehicle.

Figure 3:
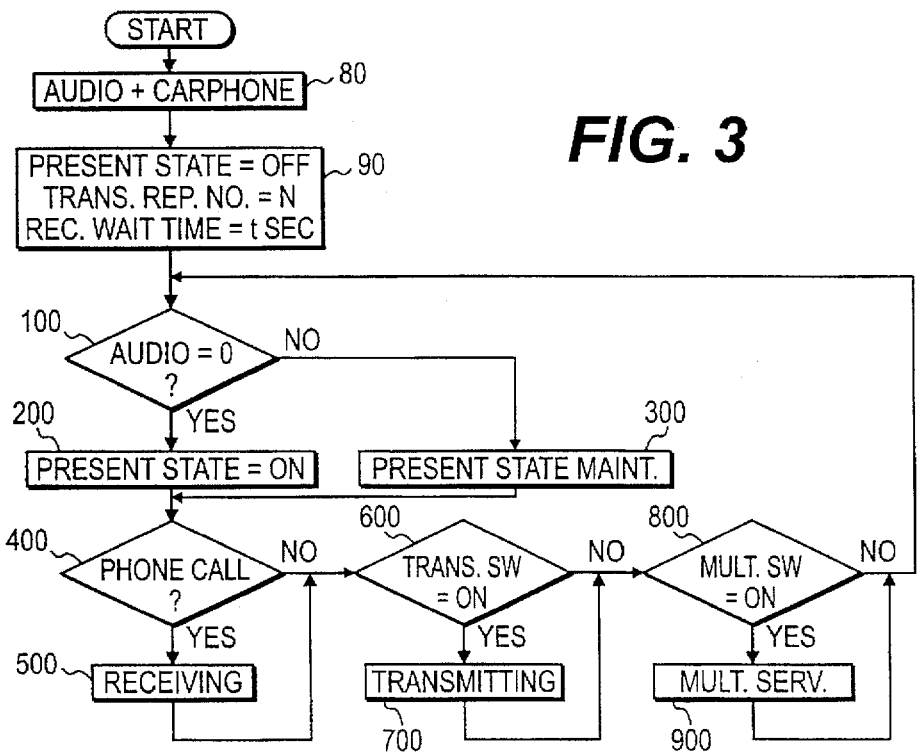
FIG. 3 is a flow diagram illustrating the transmitting and receiving operation of the car phone according to an embodiment of the present invention.

As shown in FIG. 3, the separate transmitting/receiving type of car phone of the present invention proceeds the through the following routine:

a step 80 for operatively connecting the vehicle audio terminal 10 and the car phone terminal 20 when the user inserts an ignition key into an ignition switch in the vehicle;

a step 90 for selecting a mode to set and store in memory the present state in an OFF-position, a number (N) of times that transmission is repeated, and a waiting period (t secs) prior to reception of signals, where the t second is about 30–60 seconds, for example;

a step 100 for determining whether the vehicle audio terminal 10 is in an ON-position;

a step 200 for changing the present state to an ON-position if it is determined that the vehicle audio terminal is in an ON-position;

a step 300 for maintaining the present state in the OFF-position if it is determined that the vehicle audio terminal is in an OFF-position;

a step 400 for determining whether the phone rings after either the step 200 or the step 300;

a seventh step 500 for receiving the phone call if the phone rings;

a step 600 for determining whether a transmitter switch is in an ON-position;

a step 700 for transmitting a message when the transmitter switch is in an ON-position;

a step 800 for determining whether a multiservice switch is in an ON-position in the step 800; and a step 900 for actuating a multiservice operation when the multiservice switch is determined to be in the ON-position at the step 800.

Figure 4:
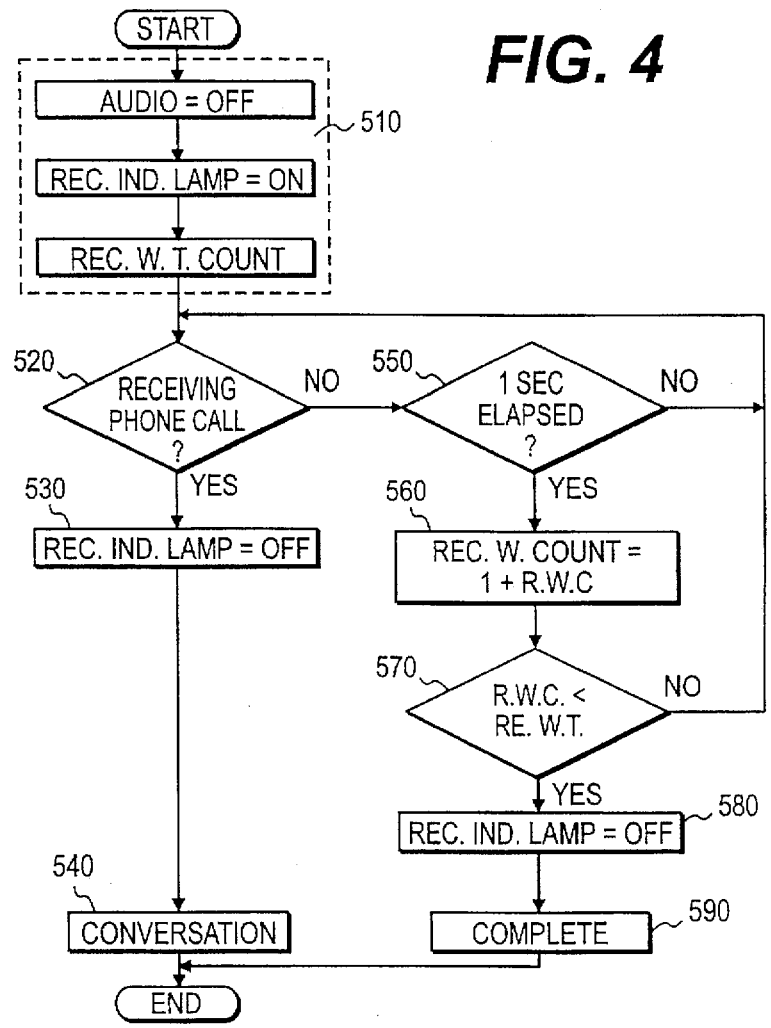
FIG. 4 is a flow diagram showing further detail of the receiving step of the car phone according to the present invention.

FIG. 4 illustrates a flow diagram for performing the receiving step 500 according to an embodiment of the present invention. The receiving step 500 according to the present invention proceeds through the following routine:

a receiving mode changing step 510 for simultaneously counting an elapsed interval t in seconds if a phone call is received at the step 400, and automatically placing the vehicle audio terminal 10 in an OFF-position and the receipt indication lamp in an ON-position;

a judgment step 520 for determining if the phone call is received after the receiving mode changing step 510;

a mode changing step 530 for placing a receiving indication lamp in an OFF-position once the phone call is received;

a phone conversation step 540 for speaking over the phone after the mode changing step 530;

a decision step 550 for determining if a second has elapsed;

an incremental counting step 560 for increasing the wait count by one when the predetermined time has elapsed;

an excess decision step 570 for determining whether the count value in the incremental counting step 560 is greater than a predetermined wait count value;

a receiving indication lamp OFF-position step 580 for turning off the indication lamp if the count value exceeds the predetermined wait count value; and a completion step 590 for terminating operation after the receiving indication lamp OFF-position step 580, whereas the judgment step 520 is repeated if the count is not proceeding in the judgment step 550 or the count value is not greater than the predetermined value in the decision step 520.

Figure 5:
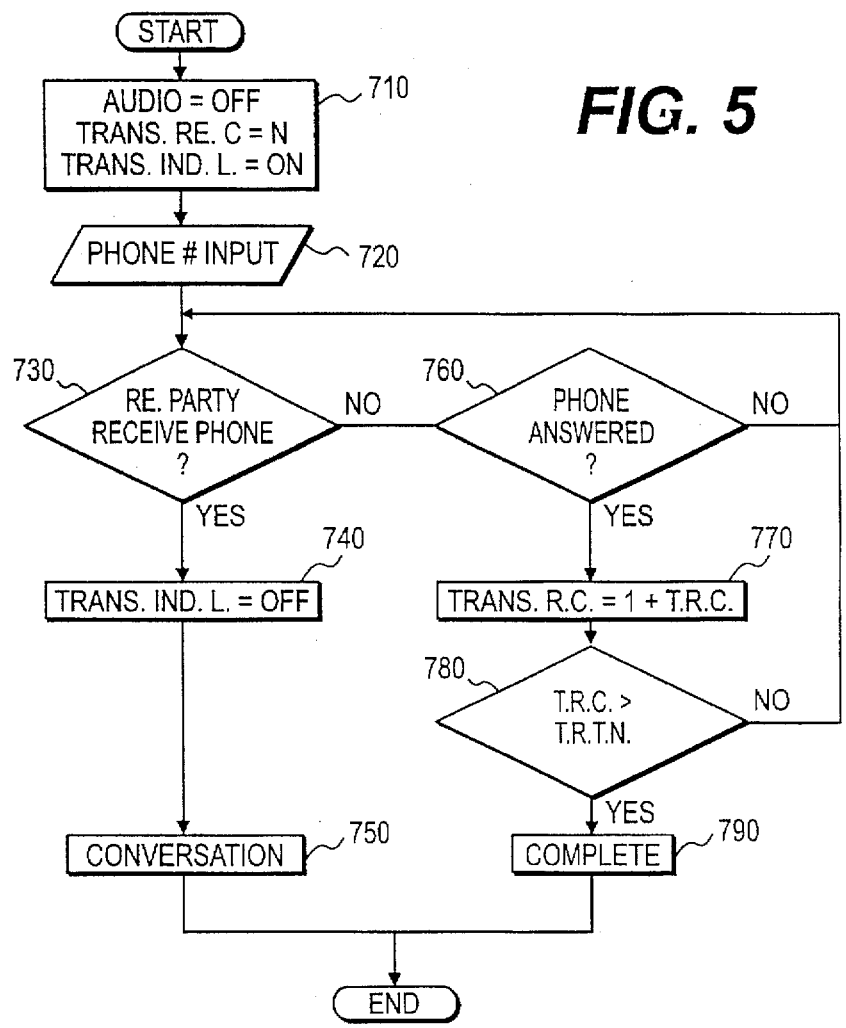
FIG. 5 is a flow diagram showing further detail of the transmitting operations of the car phone according to the present invention.

FIG. 5 illustrates a flow diagram for performing the transmitting step 700 according to an embodiment of the present invention. The transmitting step 700 according to the present invention proceeds through the following routine:

a transmitting mode changing step 710 for simultaneously placing the transmitting indicating lamp in an ON-position if the transmitting switch is in an ON-position in the step 600, the vehicle audio terminal in an OFF-position and transmission repeat count to zero (0);

a phone number input step 720 for enabling input of an outgoing phone number after the transmitting mode changing step 710;

a decision step 730 for determining whether the dialed party receives the phone call in the transmitting of the transmission signals in the step 720;

a transmitting indicating OFF-position step 740 for turning off the indicating lamp if the dialed party receives the phone call in the decision step 730;

a phone conversation step 750 during which a phone conversation is held after the transmitting indicating OFF-position step 740;

a decision step 760 for determining whether the transmitting count is increasing if there is no answer to the phone call in the decision step 730;

a counting step 770 for incrementing by one the transmitting count;

a comparison step 780 for determining if the counted value is greater than the predetermined value after the counting step 770;

a completing step 790 for terminating the transmitting of the dialed phone number if after the comparison step 780, the counted value is greater than the predetermined value. On the other hand, if the transmitting count is less than the predetermined value, the decision step 730 repeats.

Figure 6:
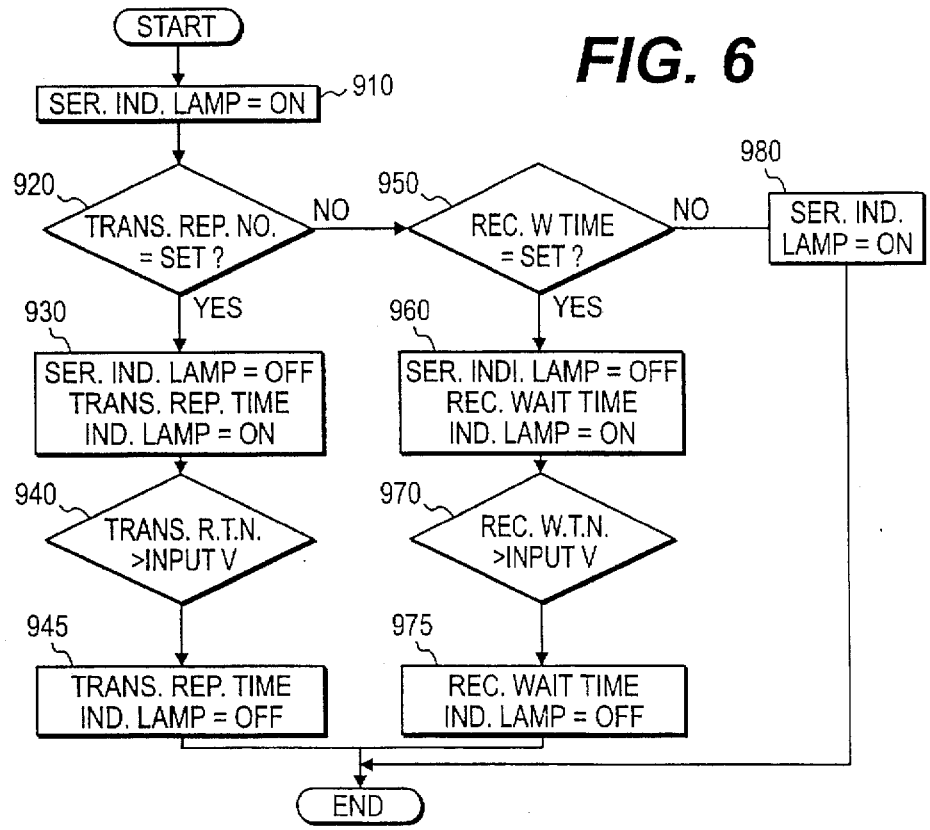
FIG. 6 is a flow diagram of multiservice operations of the car phone according to the present invention.

FIG. 6 illustrates the practical flow diagram of the multiservice step 900 according to the present invention. The multiservice step 900 according to the present invention proceeds through the following routine:

a multiservice indicating lamp ON-position changing step 910 for illuminating the indicating lamp if the multiservice switch is in an ON-position in the step 800;

a decision step 920 for determining whether the transmitting count value is initiated after the multiservice indicating lamp ON-position step 910;

a multiservice code changing step 930 for simultaneously changing to an ON-position of the transmitting indicator lamp, if the transmitting count value is initialized, and setting the multiservice indicating lamp in an OFF-position in the decision step 920;

a decision step 940 for determining whether the transmitting count value is greater than a predetermined value after the multiservice code changing step 930;

a transmitting indicating lamp OFF-position step 945 for extinguishing the transmitting lamp if the predetermined transmitting count value is exceeded in the decision step 940;

a decision step 950 for determining whether the receiving waiting time count is initialized if the transmitting count value is not initialized in the transmitting indicating lamp OFF-position step 945;

a transmitting indicating ON-position changing step 960 for placing the multiservice indicating lamp in an OFF-position;

a decision step 970 for determining whether the receiving waiting time count is greater than the predetermined time value;

an OFF-position step 975 for automatically extinguishing a receiving waiting time indicating lamp if the receiving waiting time count value is greater than the predetermined value in the decision step 970; and a multiservice indicating lamp OFF-position step 980, for extinguishing the multiservice indicating lamp if the receiving waiting time count value is not set in the decision step 950.

Figure 7:
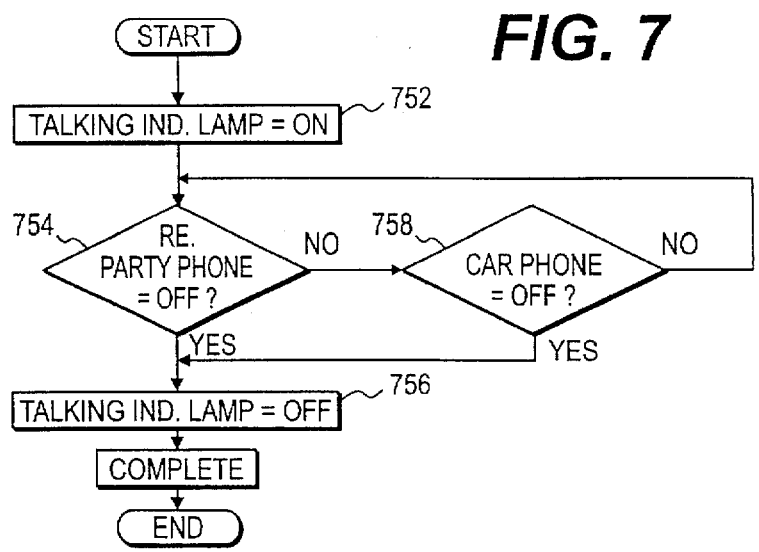
FIG. 7 is a flow diagram of a phone conversation step of the car phone of FIGS. 4 and 5 according to a first embodiment of the present invention.

FIG. 7 illustrates the practical flow diagram of the phone conversation step 540 in FIG. 4, and the phone conversation step 750 in FIG. 5 according to the present invention. The phone conversation steps 540 and 750 of the present invention proceed through the following routine:

an ON-position changing step 752 of a conversation indicating lamp illuminates a conversation lamp if the phone conversation is occurring in the phone conversation steps 540 and 750;

a decision step 754 for determining whether the phone of the respective party is in an OFF-position after the ON-position changing step 752;

an OFF-position step 756 for extinguishing the conversation indicating lamp if the phone of the respective party is in an OFF-position in the decision step 756;

a decision step 758 for determining if the phone of the respective party is in an OFF-position in the OFF-position step 756; and a decision step 758 for determining, when the phone of the respective party is not in an OFF-position, whether the car phone is in an OFF-position, and if the car phone is not in an OFF-position, the decision step 754 is repeated.

Figure 8:
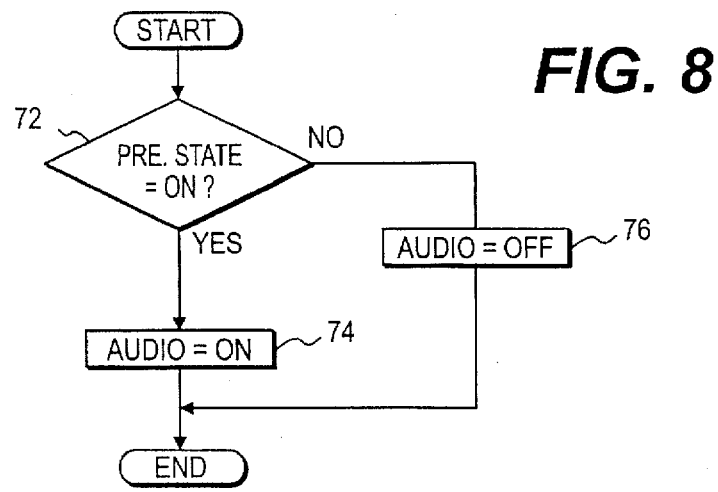
FIG. 8 is a flow diagram of an audio termination of the car phone according to the present invention.

FIG. 8 illustrates the practical flow diagram of ending steps in FIGS. 4 through 7 according to the present invention. The ending steps of the present invention proceed through the following routine:

a decision step 72 for determining whether the vehicle audio terminal 10 is in an ON-position;

an ON-position step 74 for activating the audio system if the vehicle audio terminal 10 is in an ON-position; and an OFF-position step 76 for turning off the audio system if the vehicle audio terminal 10 is in an OFF-position.

Figure 9:
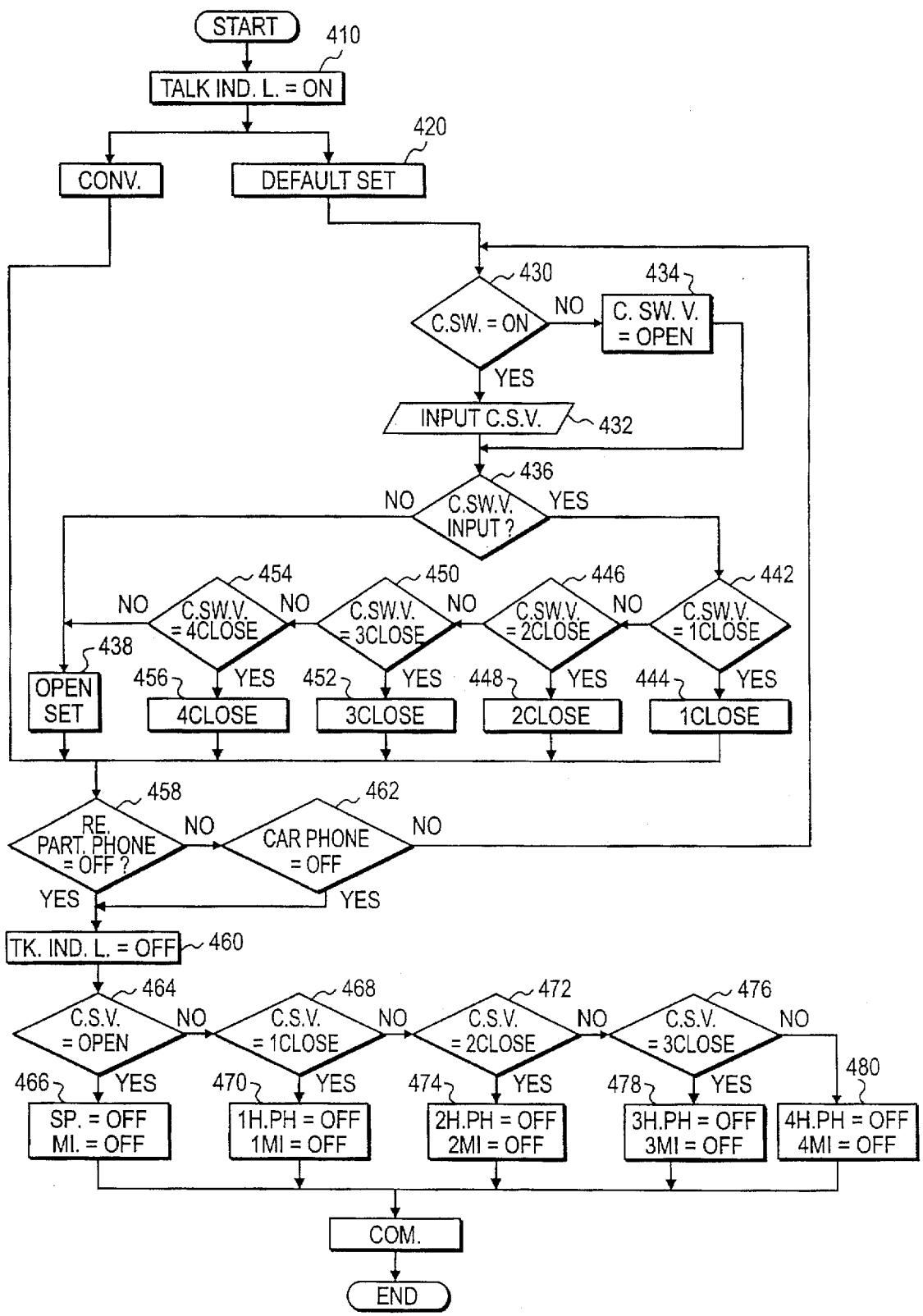
FIG. 9 is a flow diagram of a second embodiment according to the present invention showing a phone conversation step of the present invention.

FIG. 9 is a second embodiment of a car phone connected to a vehicle audio terminal according to the present invention, showing a phone conversation step of the car phone of the present invention. The second embodiment of the present invention is the same as the first embodiment of the present invention if FIG. 9 is substituted for FIG. 7 of the first embodiment of the present invention.

Accordingly, FIG. 9 illustrates the practical flow diagram of the phone conversation step 540 in FIG. 4 and the phone conversation step 750 in FIG. 5 according to the present invention. The phone conversation steps 540 and 750 of the second embodiment according to the present invention proceed through the following routine:

an ON-position step 410 for illuminating the conversation indicating lamp on the phone in the phone conversation steps 540 and 750 during the receiving and transmitting of a conversation;

a default setting step 420;

a decision step 430 for determining whether a converting switch where the converting switch actuates one of the car phone jacks is in an ON-position after the default setting step 420;

an inputting step 432 for receiving the value of the converting switch if the converting switch is in an ON-position;

a step 434 for setting the switch value as open to allow operation of all of the car phone jacks, if it is determined that more than one car phone jack should be on;

a decision step 436 for determining whether the converting switch value is input;

a step 438 for allowing full operation of all of the car phone jacks;

a decision step 442 for determining if the converting switch value is 1CLOSE;

a setting step 444 for turning on the corresponding car phone jack if the decision of step 442 is YES;

a decision step 446 for determining if the converting switch value is 2CLOSE when the converting switch value is not 1CLOSE in the decision step 442;

a setting step 448 for turning on the corresponding car phone jack if the decision of step 442 is YES;

a decision step 450 for determining if the converting switch value is 3CLOSE when the converting switch value is not 2CLOSE in the decision step 442;

a setting step 452 for turning on the corresponding car phone jack if the decision of step 450 is YES;

a decision step 454 for determining if the converting switch value is 4CLOSE when the converting switch value is not 3CLOSE in the decision step 450;

a setting step 456 for turning on the corresponding car phone jack if the decision of step 454 is YES;

a step of turning on all of the car phone Jacks if the converting switch value is not 4CLOSE;

a decision position step 458 for determining whether the phone of the respective party is in an OFF-position after the steps 438, 444, 448, 452, and 456;

a step 460 for placing the conversation indicating lamp in an OFF-position if the phone of the respective party is in an OFF-position; and determining in step 462 whether the car phone is in an OFF-position if the phone of the respective party is not in an OFF-position, and if the car phone is in an OFF-position, proceeding with step 460, and if the car phone is not in an OFF-position, proceeding with step 430.

The phone conversation steps 540 and 750 of the second embodiment of the present invention further proceed through the following routine:

determining at step 464 whether the converting switch value is in an open-position;

placing a speaker and microphone in an OFF-position in step 466 if the converting switch value is opened in the step 464;

determining at step 468 whether the converting switch value 1 is 1CLOSE if the converting switch value is not opened in the step 464;

determining at step 472 whether the converting switch value is 2CLOSE if the converting switch value is not 1CLOSE;

placing the headphone and microphone in an OFF-position two times in step 474 if the converting switch value is 2CLOSE in the step 472;

determining at step 476 whether the converting switch value is 3CLOSE if the converting switch value is not 2CLOSE in the step 472;

placing the headphone and microphone in an OFF-position three times in step 474 if the converting switch value is not 3CLOSE; and placing the headphone and microphone in an OFF-position four times in step 480 if the converting switch is not 3CLOSE.

FIGS. 10 through 20 illustrate a third embodiment of the transmitting and receiving type car phone combined with a vehicle audio unit according to the present invention.

Figure 10:
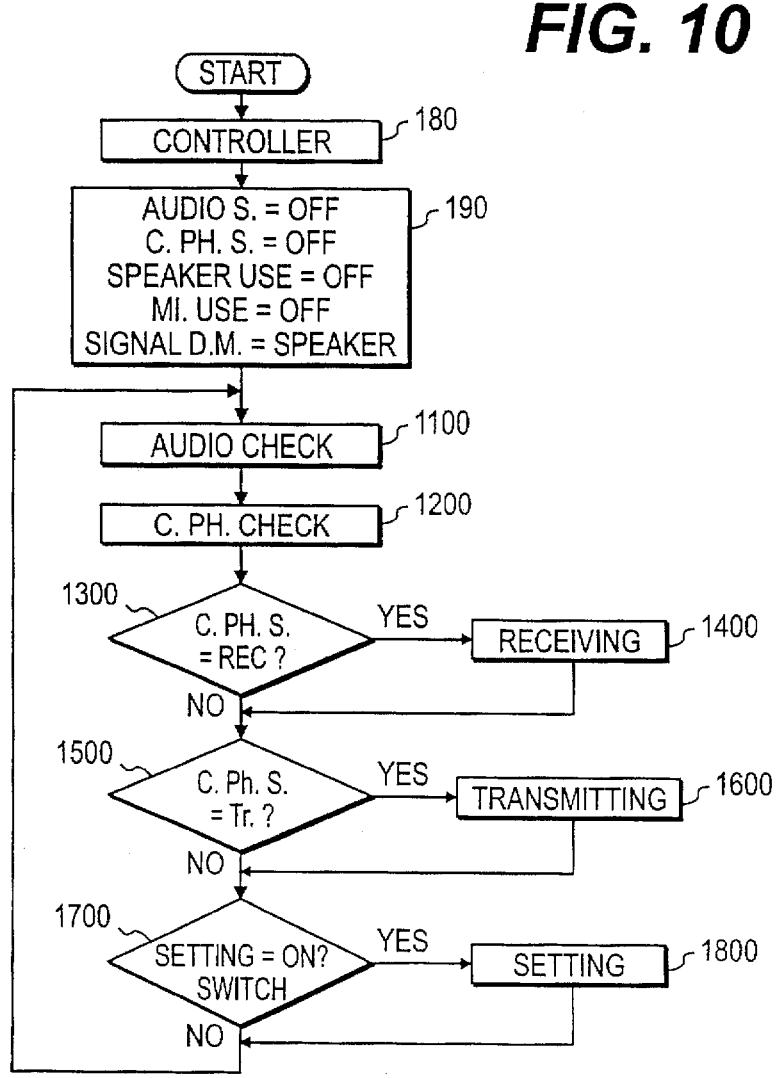
FIG. 10 is a flow diagram of a third embodiment according to the present invention.

FIG. 10 is a practical flow diagram according to the present invention. As shown in FIG. 10, the transmitting/receiving type of car phone of the present invention proceeds through the following routine:

a controlling step 180 for controlling a vehicle audio state when the user inserts a vehicle key into the ignition, a car phone state, controlling a speaker use indicator, and controlling a signal delivery method (speaker or car phone selection);

a mode OFF-position step 190 for setting the vehicle audio in an OFF-position, the car phone in an OFF-position, the speaker use indicator to OFF, the microphone use indicator to OFF, and the signal delivery method to use a speaker in the step 180;

checking a vehicle audio in step 1100 after the step 190;

checking a car phone in step 1200 after the step 1100;

determining in step 1300 whether the car phone state is in a receiver ON-position after the step 1200;

receiving signals in step 1400 if the car phone state is in the receiver ON-position in the step 1300;

determining at step 1500 whether the car phone state is in a transmission ON-position;

transmitting a signal in step 1600 if the car phone state is in the transmission ON-position in the step 1500;

determining at step 1700 whether a mode setting switch is in an ON-position;

a mode setting step 1800 for setting a mode if the setting switch is in an ON-position in the step 1700, and returning to the step 1100 if the setting switch is not in an ON-position.

Figure 11:
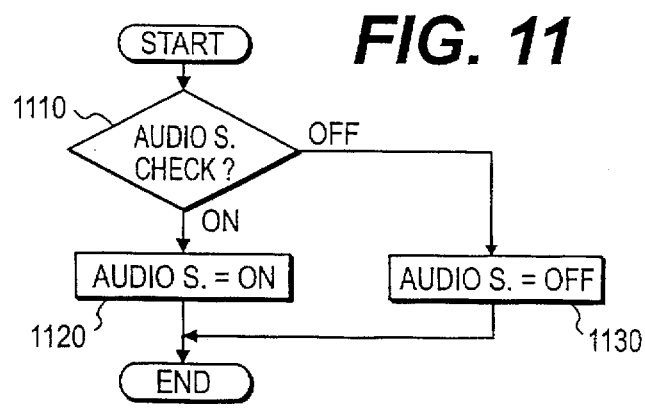
FIG. 11 is a flow diagram of the third embodiment according to the present invention showing the vehicle audio checking step of FIG. 10 of the present invention.

FIG. 11 illustrates a flow diagram for performing the audio checking step 1100 of FIG. 10 where the step 1100 proceeds through the following routine:

determining at step 1110 whether the vehicle audio state is in an ON-position;

maintaining the ON-position of the audio state in an ON-position maintaining step 1120, if the vehicle audio state is determined to be in the ON-position; and maintaining an OFF-position for the audio state in an OFF-position maintaining step 1130, if the car audio state is determined to be not in an ON-position.

Figure 12:
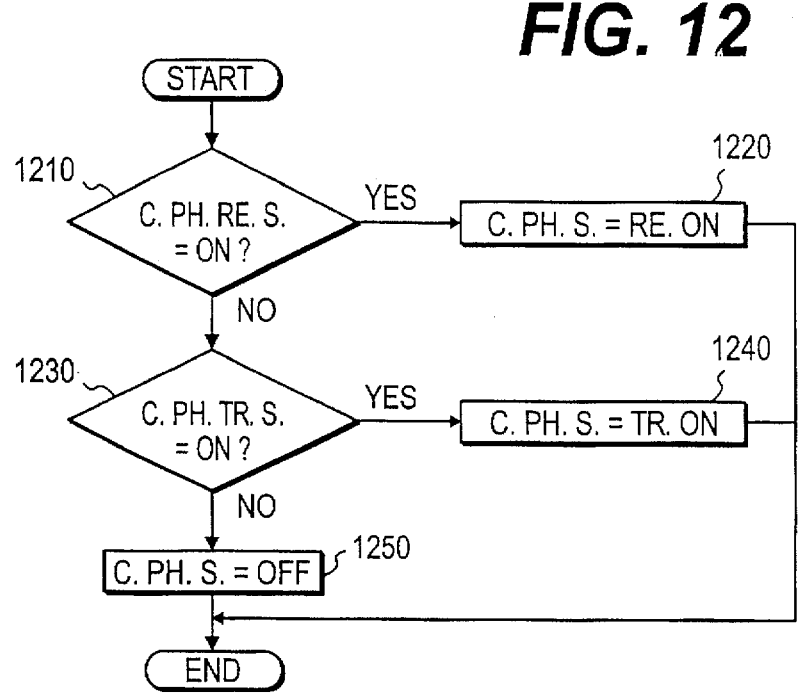
FIG. 12 is a flow diagram of the third embodiment according to the present invention showing the car phone checking step of FIG. 10 of the present invention.

As shown in FIG. 12, the car phone checking step 1200 of FIG. 10 according to the present invention proceeds through the following routine:

determining at step 1210 whether the car phone state is in a receiving state;

maintaining an ON-position in step 1220 if the car phone receiving state is determined to be in the ON-position in the step 1210;

determining at step 1230 whether the car phone transmitting state is in an ON-position if the car phone receiving state is not in an ON-position in the step 1210;

maintaining the ON-position in a transmitting state maintaining step 1240 if the car phone transmitting state is determined to be in the ON-position in the step 1230; and maintaining a car phone state maintaining step 1250 if, in the step 1230, the car phone transmitting state is in the OFF-position.

Figure 13:
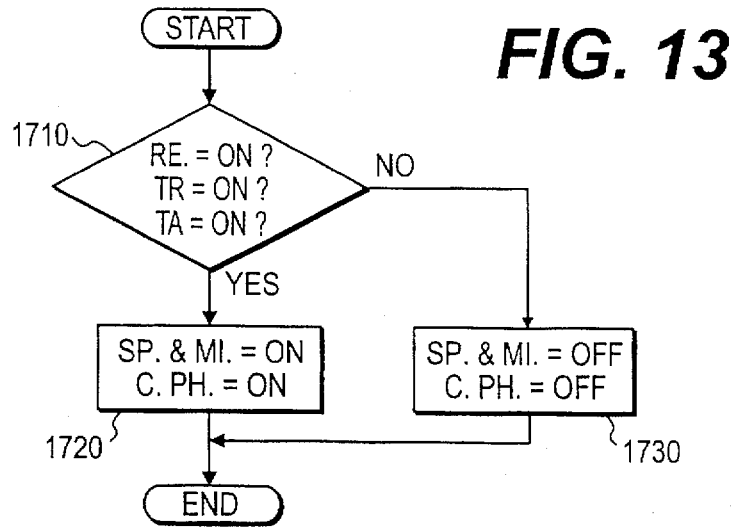
FIG. 13 is a flow diagram of the third embodiment according to the present invention showing the switch setting step of FIG. 10 of the present invention.

As shown in FIG. 13, the setting step 1800 of FIG. 10 according to the present invention proceeds through the following routine:

a decision step 1710 for determining whether the receiving, transmitting, and conversation switches are in an ON-position;

an ON-position setting step 1720, if the switches are in the ON-position, for setting the speaker, microphone, and the car phone to be in an ON-position ready for operations; and an OFF-position setting step 1730, if the switches are in the OFF-position, for setting the speaker, microphone, and the car phone to be in an OFF-position.

Figure 14:
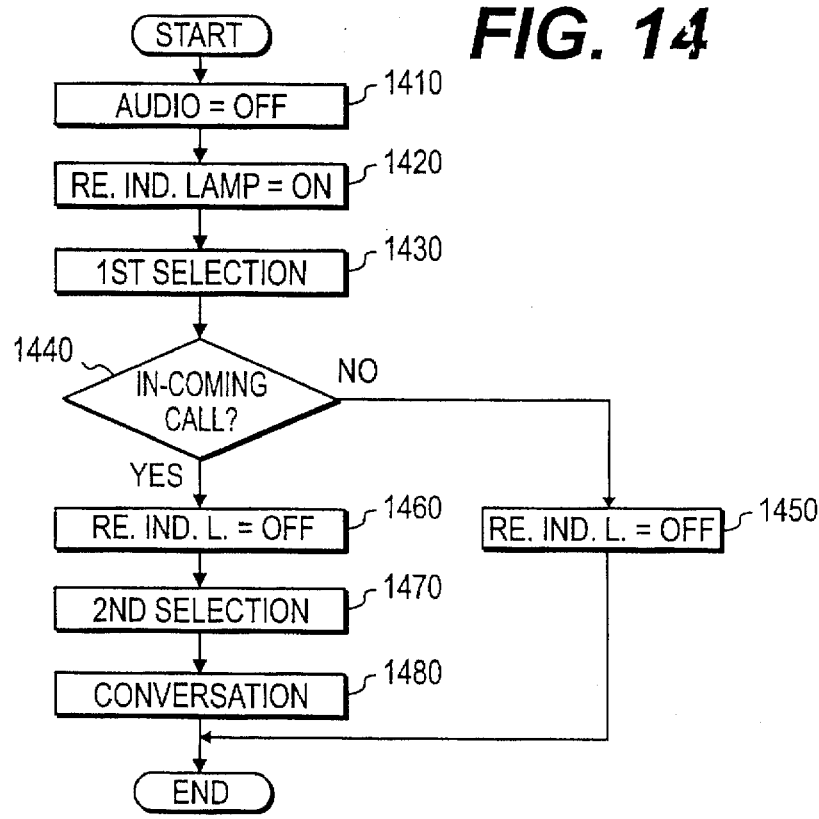
FIG. 14 is a flow diagram of the third embodiment according to the present invention showing the receiving step of FIG. 10 of the present invention.

As shown in FIG. 14, the receiving step 1400 of FIG. 10 according to the present invention proceeds through the following routine:

a vehicle audio OFF-position setting step 1410 for setting the audio off if the car phone is in a receiving state in the step 1300;

an ON-position changing step 1420 for turning on the receiving indicating lamp after the step 1410;

a first delivery method selecting step 1430 for selecting to deliver a voice either to a car phone or to a speaker after the step 1420;

a decision step 1440 for determining whether there is an incoming phone call after the step 1430;

an OFF-position step 1450 for turning off the receiving indicating lamp if there are no incoming phone calls for a predetermined time in the step 1440;

an OFF-position step 1460 for turning off the receiving indicating lamp if an incoming phone call is received in the step 1440;

a delivery step 1470 for delivering the receiving and transmitting signals to either the microphone speaker or to the car phone after the step 1460; and a conversation step 1480 being conducted after the step 1470.

Figure 15:
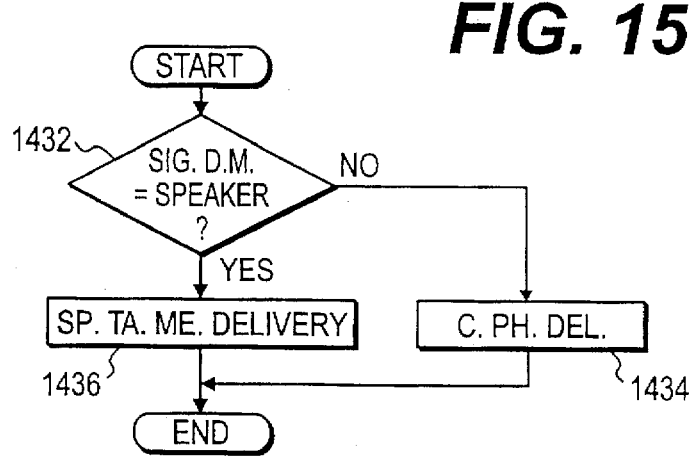
FIG. 15 is a flow diagram of the third embodiment according to the present invention showing the first delivery method selection step of FIG. 14.

FIG. 15 illustrates the first delivery method selection step 1430 of FIG. 14 according to the present invention which proceeds through the following routine:

a decision step 1432 for determining if the transmission indicating lamp is in an ON-position in the step 1420, whether the speaker is selected by using a signal delivery method;

a car phone usage step 1434 for delivering a signal to the car phone if, in the step 1432, the speaker is not selected by the signal delivery method; and a speaker usage step 1436 for delivering a signal to the speaker if the speaker is selected in the step 1432.

Figure 16:
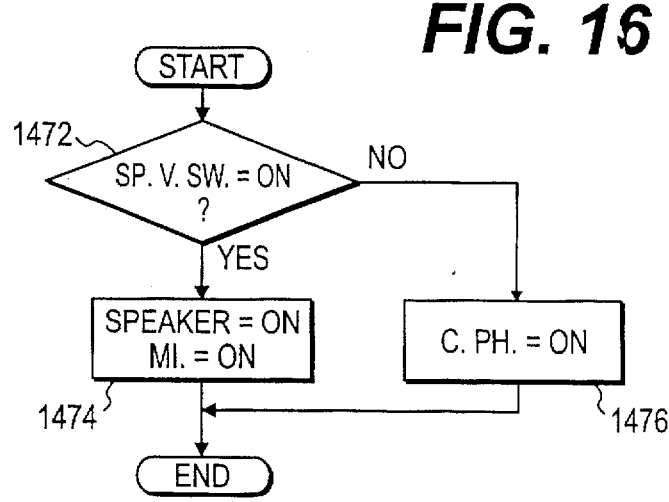
FIG. 16 is a flow diagram of the third embodiment according to the present invention showing the second delivery method selection step of FIG. 14.

FIG. 16 illustrates the second delivery method selection step 1470 of FIG. 14 according to the present invention which proceeds through the following routine:

a judgment step 1472 for determining whether the speaker usage switch is in an ON-position, if the receiving indicating lamp is in an OFF-position in the step 1460;

a speaker and microphone switching step 1474 for turning on both the speaker and the microphone, if the speaker usage switch is in the ON-position in the step 1472; and a car phone ON-position step 1476 for turning on the car phone, if the speaker usage switch is in the OFF-position.

Figure 17:
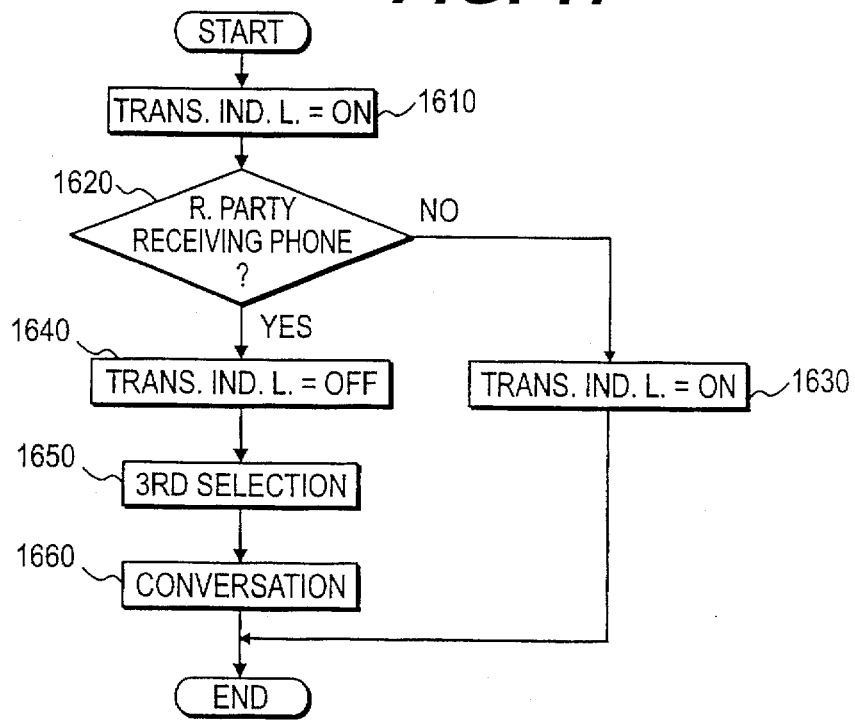
FIG. 17 is a flow diagram of the third embodiment according to the present invention showing the transmitting step of FIG. 10.

As shown in FIG. 17, the transmitting step 1600 of FIG. 10 according to the present invention proceeds through the following routine:

a transmitting indicating lamp ON-position step 1600 for turning on the transmitting indicating lamp if the car phone is used to place a phone call in the step 1500;

a decision step 1620 determining whether the respective party answers the phone call after the step 1610;

a transmitting indicating lamp OFF-position step 1630 for turning off the transmitting indicating lamp, if the respective party does not answer the phone call for a predetermined time in the step 1620;

a transmitting indicating lamp OFF-position step 1640 if the respective party answers the phone call in the step 1620;

a third delivery method selection step 1650 for determining, if the transmitting indicating lamp is in an OFF-position in the step 1640, whether the speaker, microphone, or car phone is selected; and a step 1660 indicating that conversation is occurring.

Figure 18:
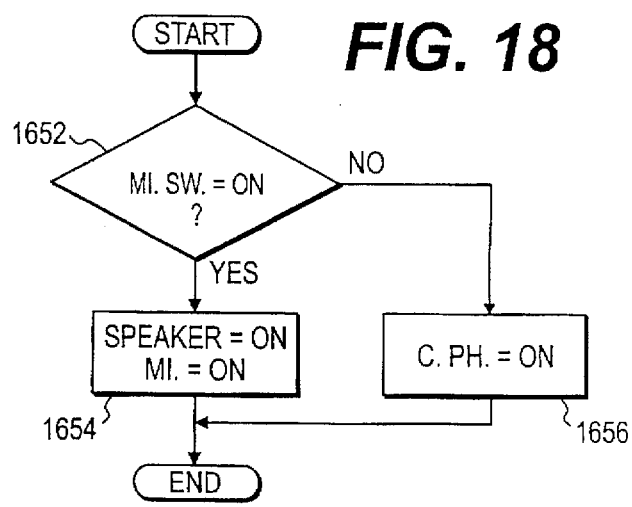
FIG. 18 is a flow diagram of the third embodiment according to the present invention showing the third delivery method selection step of FIG. 17.

As shown in FIG. 18, the third delivery method selection step 1650 of FIG. 17 according to the present invention proceeds through the following routine:

a decision step 1652 for determining whether or not the microphone is being used if the transmitting indicating lamp is in an OFF-position in the step 1640;

an ON-position changing step 1654 for turning on the speaker and microphone if the microphone switch is on in the step 1652; and an ON-position changing step 1656 for turning on the car phone if the microphone is not being used in the step 1652.

Figure 19:
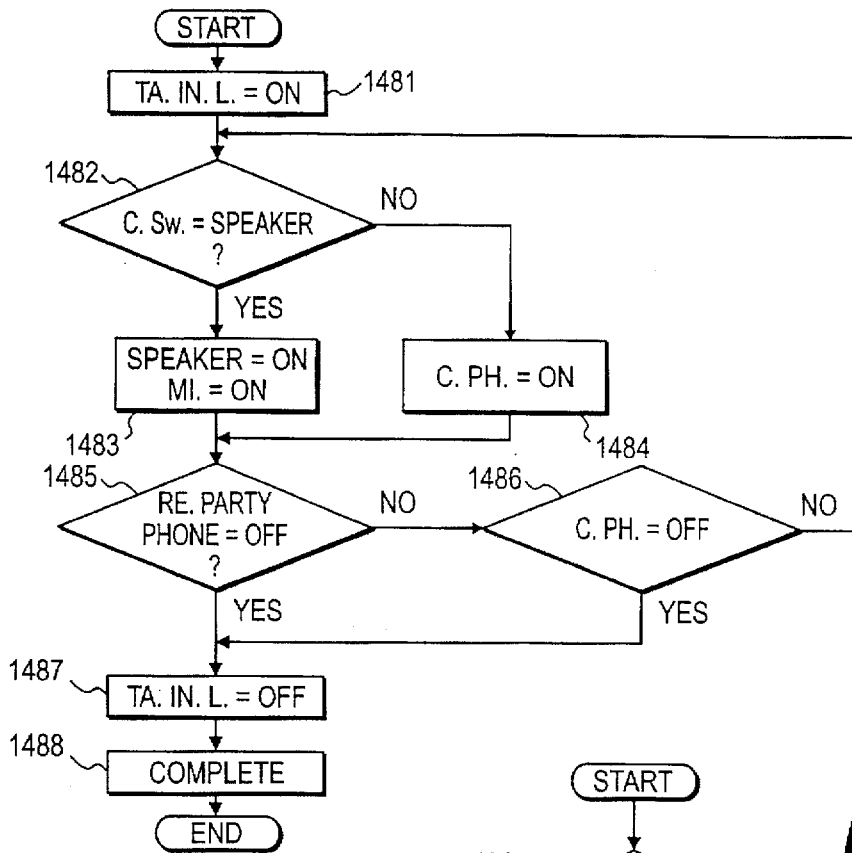
FIG. 19 is a flow diagram of the third embodiment according to the present invention showing the conversation step of FIGS. 14 and 17.

As shown in FIG. 19, the step 1480 of FIG. 14 and the step 1660 of FIG. 17 according to the present invention proceed through the following routine:

a step 1481 for indicating talking by turning on a talk indicating lamp;

a decision step 1482 for determining whether or not the converting switch selects the speaker;

an ON-position step 1483 for turning on the speaker and microphone if the speaker is selected in the step 1482;

an ON-position step 1484 turning on the car phone if the speaker is not selected in the step 1482;

a decision step 1485 for determining whether or not the phone of the respective party is in an OFF-position in the steps 1483 and 1484;

a decision step 1486 for determining whether the car phone is in an OFF-position, if the phone of the respective party is in an ON position;

an OFF-position step 1487 for turning off the talk indicating lamp if the car phone is in an OFF-position and the respective party's phone is in an OFF-position; and a step 1488 after the step 1487 for ending all steps.

Figure 20:
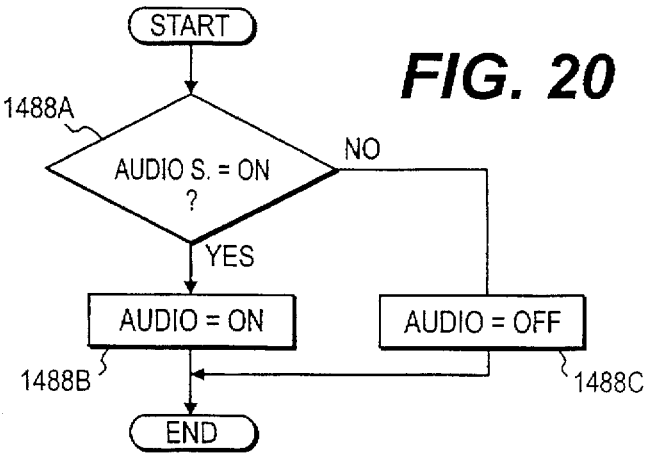
FIG. 20 is a flow diagram of the third embodiment according to the present invention showing the completing step of FIG. 19.

As shown in FIG. 20, the step 1488 of FIG. 19 according to the present invention proceeds through the following routine:

a decision step 1488A for determining whether the vehicle audio is in an ON-position if the talk indicating lamp is in an OFF-position during talking in the step 1487;

a step 1488B for maintaining the present state of the audio if the vehicle audio is in an ON-position in the step 1488A; and a step 1488C for maintaining the present state of the audio, if the vehicle audio is in an OFF-position continuously in the step 1488A.

Accordingly, the transmitting and receiving type of a car phone connected to a vehicle audio unit according to the present invention can have effectively improved transmitting and receiving functions, and is simple in structure and inexpensive to manufacture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of operating a telephone device having a plurality of telephone jacks, connectable with an audio unit, a plurality of speakers, and a plurality of microphones, all located in a vehicle, comprising the steps:

connecting the telephone device with the audio unit;

connecting the plurality of telephone lacks with the plurality of speakers and microphones;

setting parameters disposed in the telephone device for a telephone operation to be combined with the use of the audio unit to carry out the telephone operation;

receiving an incoming telephone signal through one of the telephone jacks;

visually indicating the incoming telephone signal to be received by the telephone device;

terminating the visual indication and carrying out a conversation operation, if the incoming telephone signal is received by the telephone device;

waiting a predetermined time and terminating the visual indication, if the incoming telephone signal is not received by the telephone device;

transmitting an outgoing telephone signal through one of the telephone jacks; and selectively activating one of the telephone jacks to carry out the telephone operation.

2. The method of claim 1, wherein said carrying out a conversation operation step includes the step of:

determining whether or not a converting switch is in an on-position to activate said one of the telephone jacks.

3. The method of claim 2, wherein said carrying out a conversation operation step further includes the steps of:

determining a value of the converting switch designating said one of the telephone jacks, if the converting switch is determined to be in the on-position; and activating said one of the phone jacks according to the determined value of the converting switch.

4. The method of claim 2, wherein said carrying out a conversation operation step further includes the step of:

activating all of said plurality of telephone jacks, if the converting switch is determined to be in an off-position and if no predetermined value of the converting switch is input to the telephone device.

5. The method of claim 3, wherein said carrying out a conversation operation step further includes the step of:

turning off one of the microphones according to the activation telephone jacks.

6. The method of claim 4, wherein said carrying out a conversation operation step further includes the step of:

turning off all the speakers and microphones.

7. The method of claim 1, wherein said transmitting step includes the steps of:

visually indicating an outgoing telephone signal to be transmitted;

inputting a telephone number to generate the outgoing telephone signal;

terminating the visual indication and carrying out a conversation operation, if the outgoing telephone signal is received by a dialed party; and waiting a predetermined time and terminating the visual indication, if the outgoing telephone signal is not received by the dialed party.

8. The method of claim 7, wherein said carrying out a conversation operation step further includes the step of:

determining whether or not a converting switch is in an on-position to activate said one of the telephone jacks.

9. The method of claim 8, wherein said carrying out a conversation operation step further includes the steps of:

determining a value of the converting switch designating said one of the telephone jacks, if the converting switch is determined to be in the on-position; and activating said one of the phone jacks according to the determined value of the converting switch.

10. The method of claim 8, wherein said carrying out a conversation operation step further includes the step of:

activating all of said plurality of telephone jacks, if the converting switch is determined to be in an off-position and if no predetermined value of the converting switch is input to the telephone device.

11. The method of claim 9, wherein said carrying out a conversation operation step further includes the step of:

turning off one of the microphones according to the activation of telephone jacks.

12. The method of claim 10, wherein said carrying out a conversation operation step further includes the step of:

turning off all the speakers and microphones.

13. The method of claim 1, wherein the telephone device includes a car phone connected to the audio unit, and said receiving step includes the steps of:

visually indicating that the telephone operation is a receiving operation;

selecting between the car phone and the speakers to receive the incoming telephone signal; and activating either the car phone or one of the speakers and one of the microphones based on the selection result.

14. The method of claim 1, wherein the telephone device includes a car phone connected to the audio unit, and said transmitting step includes the steps of:

visually indicating that the telephone operation is a transmitting operation;

selecting the car phone to transmit the outgoing telephone signal; and activating the microphones to send signals to the car phone; and transmitting said signals as the outgoing telephone signal.

\* \* \* \* \*